# 2,942,011
2-BROMO-DIHYDRO ALLOHYDROCORTISONE

George Krsek, Danville, Pa., assignor to Merck & Co., Inc., Rahway, N.J., a corporation of New Jersey No Drawing. Filed Nov. 16, 1955, Ser. No. 547,297

3 Claims. (Cl. 260—397.45)

This invention is concerned generally with allopregnane compounds and with processes for preparing them. More particularly, it relates to novel $\Delta^1$-3,20-diketo-11$\beta$,17$\alpha$-dihydroxy-21-oxygenated-allopregnenes, and with novel processes of preparing these compounds starting with 3,20-diketo-11$\beta$,17$\alpha$-dihydroxy-21-acyloxypregnane.

The new compounds, $\Delta^1$-3,20-diketo-11$\beta$,17$\alpha$-dihydroxy-21-acyloxy-allopregnenes, may be chemically represented as follows:

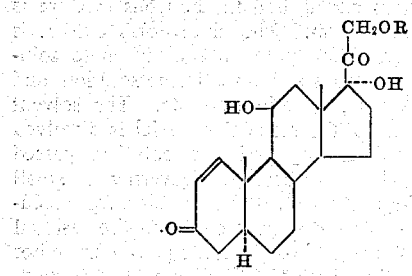

wherein R is an acyl radical. These $\Delta^1$-3,20-diketo-11$\beta$,17$\alpha$-dihydroxy-21-acyloxy-allopregnenes have been demonstrated to possess extremely high local cortisone activity accompanied by practically no systemic action. They are thus of particular value in the treatment of conditions which heretofore respond to the local administration of cortisone and hydrocortisone, without the production of side effects such as edema which can be caused by the sodium retention action of cortisone and hydrocortisone.

The $\Delta^1$-3,20-diketo-11$\beta$,17$\alpha$-dihydroxy-21-acyloxy-allopregnenes, subject of the present invention, can be prepared by reacting 3,20-diketo-11$\beta$,17$\alpha$-dihydroxy-21-acyloxy-allopregnane (Compound 1 hereinbelow) with a halogenating agent to form 2-halo-3,20-diketo-11$\beta$,17$\alpha$-dihydroxy-21-acyloxy-allopregnane (Compound 2), which is then reacted with a dehydrohalogenating agent to produce $\Delta^1$-3,20-diketo-11$\beta$,17$\alpha$-dihydroxy-21-acyloxy-allopregnene (Compound 3).

The reactions indicated hereinabove may be chemically represented as follows:

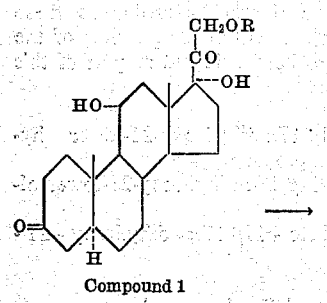

Compound 1

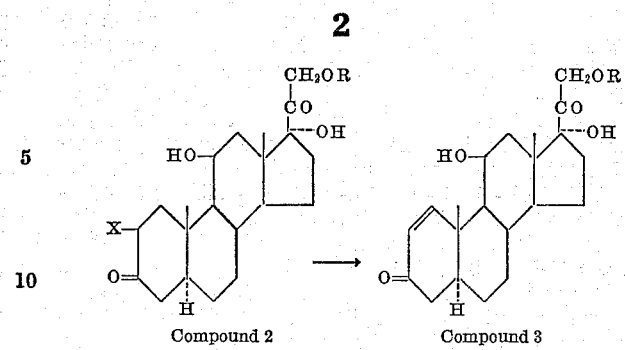

Compound 2       Compound 3 wherein X stands for a halo radical, and R has the significance above-defined.

The 3,20 - diketo-11$\beta$,17$\alpha$-dihydroxy-21-acyloxy-allopregnanes used as starting materials include 3,20-diketo-11$\beta$,17$\alpha$-dihydroxy-21-alkanoyloxy-allopregnane, 3,20-diketo-11$\beta$,17$\alpha$-dihydroxy-21-acetoxy-allopregnane, 3,20-diketo - 11$\beta$,17$\alpha$-dihydroxy-21-propionoxy-allopregnane, 3,20 - diketo-11$\beta$,17$\alpha$-dihydroxy-21-heptanoyloxy-allopregnane, 3,20 - diketo - 11$\beta$,17$\alpha$-dihydroxy-21-benzoxy-allopregnane, and the like.

The halogenation of the 3,20-diketo-11$\beta$,17$\alpha$-dihydroxy-21-acyloxy-allopregnane is conveniently conducted utilizing a halogenating agent of the positive halogen type, such as bromine, N-bromoamides, chlorine, N-chloroamides, tertiary butyl hypochlorite, and the like. When bromine or chlorine is used as the halogenating agent, the halogenation reaction is ordinarily carried out by dissolving the 3,20-diketo-11$\beta$,17$\alpha$-dihydroxy-21-acyloxy-allopregnane in a solvent inert to the halogen and adding the halogen to the resulting solution. It is ordinarily preferred to carry out the halogenation at room temperature by adding a solution of the halogen in glacial acetic acid, dropwise, to a solution of the 3,20-diketo-11$\beta$,17$\alpha$-dihydroxy21-acyloxy-allopregnane in a mixture of chloroform and glacial acetic acid containing a small amount of p-toluene sulfonic acid. The product is recovered from the halogenation mixture by evaporating the solvent and recrystallizing the residual material from a solvent such as acetonitrile to give the desired 2-halo-3,20 - diketo-11$\beta$,17$\alpha$-dihydroxy-21-acyloxy-allopregnane as for example 2-bromo-3,20-diketo-11$\beta$,17$\alpha$-dihydroxy-21 - alkanoyloxy-allopregnane, 2-bromo-3,20-diketo-11$\beta$,17$\alpha$-dihydroxy-21-acetoxy-allopregnane, 2-bromo-3,20-diketo - 11$\beta$,17$\alpha$-dihydroxy-21-propionoxy-allopregnane, 2-bromo - 3,20-diketo-11$\beta$,17$\alpha$-dihydroxy-21-benzoxy-allopregnane, and the like.

The dehydrohalogenation of the 2-halo-3,20-diketo-11$\beta$,17$\alpha$-dihydroxy-21-acyloxy-allopregnane thus formed can be carried out, if desired, by reacting this compound with a tertiary amine such as pyridine, collidine, and the like. It is preferred, however, to utilize semicarbazide and pyruvic acid as the dehydrohalogenating agent. When the latter reagent is used, the 2-halo-3,20-diketo-11$\beta$,17$\alpha$-dihydroxy-21-acyloxy-allopregnane is preferably brought into contact with the semicarbazide in a medium comprising aqueous acetonitrile, at a temperature of about 25° C., thereby forming an intermediate semicarbazone of $\Delta^1$-3,20-diketo-11$\beta$,17$\alpha$-dihydroxy-21-acyloxy-allopregnene, which is conveniently recovered from the acetonitrile reaction mixture by evaporating the latter to a thick slurry, diluting with water and cooling, whereupon the semicarbazone crystallizes and is recovered by filtration and dried. The crude $\Delta^1$-3,20-diketo-11$\beta$,17$\alpha$-dihydroxy-21-acyloxy-allopregnene 3-semicarbazone is then reacted with a solution of pyruvic acid in acetic acid at room temperature or above if desired. At room temperature, the hydrolysis of the 3-semicarbazone is ordinarily complete in about sixteen hours. The hydrolysis product is conveniently recovered by diluting the hydrolysis solution with water and extracting the aqueous mixture with chloroform. The chloroform extract is washed with water, with an aqueous alkaline solution to remove impurities, and dried. The dry chloroform solution is then evaporated to give $\Delta^1$-3,20-diketo-11$\beta$,17$\alpha$-dihydroxy-21-acyloxy-pregnene, which can be purified by chromatography followed by recrystallization from acetone-petroleum ether.

This $\Delta^1$ - 3,20 - diketo - 11$\beta$,17$\alpha$ - dihydroxy - 21 - acyloxy-pregnane is conveniently hydrolyzed by reaction with a methanolic solution of potassium bicarbonate to form $\Delta^1$-3,20-diketo-11$\beta$,17$\alpha$,21-trihydroxy-pregnene. The latter compound may then be treated with an acylating agent, preferably a carboxylic acyl anhydride as for example a lower alkanoic acid anhydride such as acetic anhydride, propionic anhydride, heptanoic anhydride, benzoic anhydride, an alicylic anhydride such as cyclopentapropionic anhydride, an aliphatic dicarboxylic acid anhydride such as succinic anhydride, glutaric anhydride, $\beta,\beta$-dimethylglutaric anhydride, maleic anhydride, adipic anhydride, an aromatic dicarboxylic acid anhydride such as phthalic anhydride, and the like. The reaction between the $\Delta^1$-3,20-diketo-11$\beta$,17$\alpha$,21-trihydroxy-pregnene and the carboxylic acyl anhydride, or if preferred the corresponding carboxylic acid halogenide, is conveniently carried out in the presence of a tertiary amine such as dimethylaniline or pyridine, thereby acylating the 21-hydroxy substituent. The acylated product is readily separated from reaction mixture by evaporating the liquid components and recrystallizing the residual material from a solvent such as ethyl acetate to give substantially pure $\Delta^1$-3,20-diketo-11$\beta$,17$\alpha$-dihydroxy-21-acyloxy-allopregnene, as for example $\Delta^1$ - 3,20 - diketo - 11$\beta$,17$\alpha$ - dihydroxy - 21 - alkanoyloxy-allopregnene, $\Delta^1$ - 3,20 - diketo - 11$\beta$,17$\alpha$ - dihydroxy - 21 - acetoxy - allopregnene, $\Delta^1$ - 3,20 - diketo - 11$\beta$,17$\alpha$ - dihydroxy - 21 - propionoxy-allopregnene, $\Delta^1$ - 3,20 - diketo - 11$\beta$,17$\alpha$ - dihydroxy - 21 - butyroxy - allopregnene, $\Delta^1$ - 3,20 - diketo - 11$\beta$,17$\alpha$ - dihydroxy - 21 - heptanoyloxy-allopregnene, $\Delta^1$ - 3,20 - diketo - 11$\beta$,17$\alpha$ - dihydroxy - 21 - benzoxy - allopregnene, $\Delta^1$ - 3,20 - diketo-11$\beta$,17$\alpha$,21 - trihydroxy - allopregnene 21-hemisuccinate, $\Delta^1$ - 3,20 - diketo - 11$\beta$,17$\alpha$,21 - trihydroxy - allopregnene 21-hemi-$\beta,\beta$-dimethylglutarate, $\Delta^1$ - 3,20 - diketo - 11$\beta$,17$\alpha$,21 - trihydroxy - allopregnene 21-cyclopentapropionate.

and the like.

The following examples illustrate methods of carrying out the present invention, but it is to be understood that these examples are given for purposes of illustration and not of limitation.

Example 1

To 813 mg. of 3,20-diketo-11$\beta$,17$\alpha$-dihydroxy-21-acetoxy-allopregnane (2.00 millimol) in 20 ml. chloroform at 15° C. is added 4.8 ml. of 0.5 N p-toluenesulfonic acid in acetic acid. To the stirred mixture is added dropwise 320 mg. of bromine (2.00 millimol) and 180 mg. sodium acetate (2.2 millimol) in 5 ml. acetic acid. The addition and decolorization are complete in about 5 minutes, following which a solution of 180 mg. sodium acetate in 3 ml. water is added. Additional water is added, and the reaction mixture is extracted with chloroform. The chloroform extract is washed with water, potassium bicarbonate solution, and water. The neutral chloroform extract is dried, and the solvent is evaporated in vacuo. The residual material is triturated with acetonitrile and the crystalline material which precipitates is recovered by filtration and purified by recrystallization from acetonitrile to give substantially pure 2 - bromo - 3,20 - diketo - 11$\beta$,17$\alpha$ - dihydroxy - 21 - acetoxy-allopregnane; M.P. 189–190° C.

Example 2

To 2-bromo-3,20-diketo-11$\beta$,17$\alpha$-dihydroxy-21-acetoxy-allopregnane (300 mg.) in 30 ml. acetonitrile is added under nitrogen 171 mg. semicarbazide hydrochloride and 117 mg. sodium bicarbonate in 1 ml. water. After two hours at 25° C., the stirred solution is evaporated in vacuo to a thick slurry, and 50 ml. water is added. The solid material is recovered by filtration, washed with water, and dried to give $\Delta^1$-3,20-diketo-11$\beta$,17$\alpha$-dihydroxy-21-acetoxy-allopregnene-3-semicarbazone;

$\lambda_{max}^{CH_3OH}$ 2650° A., E% 474

Example 3

The $\Delta^1$-3,20-diketo-11$\beta$,17$\alpha$-dihydroxy-21-acetoxy-allopregnene 3-semicarbazone obtained as described in Example 2, is dissolved in 11 ml. acetic acid, 2.8 ml. water and 0.8 ml. pyruvic acid. After sixteen hours at room temperature water is added, and the aqueous mixture is extracted with chloroform. The chloroform extract is washed with water, dilute potassium bicarbonate solution and saturated aqueous sodium chloride solution, and dried with anhydrous magnesium sulfate. The solvent is evaporated in vacuo, the residual material is dissolved in 1:1 benzene-chloroform and the solution passed through neutral alumina thereby recovering a small amount of polar impurity. The benzene-chloroform solution is evaporated to dryness in vacuo, and the residual material is recrystallized from acetone-petroleum ether to give substantially pure $\Delta^1$-3,20-diketo-11$\beta$,17$\alpha$-dihydroxy-21-acetoxy-allopregnene in the form of glistening plates; M.P. 225–230° C. dec.;

$\lambda_{max}^{CH_3OH}$ 2280, E% 265

*Analysis.*—Calcd. for $C_{23}H_{32}O_6$: C, 68.29; H, 7.98. Found: C, 68.51; H, 8.14.

Example 4

One hundred milligrams of $\Delta^1$-3,20-diketo-11$\beta$,17$\alpha$-dihydroxy-21-acetoxy-allopregnene is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure $\Delta^1$-3,20-diketo-11$\beta$,17$\alpha$,21-trihydroxy-allopregnene.

Various changes and modifications may be made in carrying out the present invention without departing from the spirit and scope thereof. Insofar as these changes and modifications are within the purview of the annexed claims, they are to be considered as part of this invention.

I claim:

1. 2-halo-3,20-diketo-11$\beta$,17$\alpha$-dihydroxy-21-lower hydrocarbon carbonyloxy-allopregnane.

2. 2-bromo-3,20-diketo-11$\beta$,17$\alpha$-dihydroxy-21-lower alkanoyloxy-allopregnane.

3. 2 - bromo - 3,20 - diketo - 11$\beta$,17$\alpha$ - dihydroxy - 21 - acetoxy-allopregnane.

(References on following page)

References Cited in the file of this patent

UNITED STATES PATENTS

| | | |
|---|---|---|
| 2,590,978 | Kendall | Apr. 1, 1952 |
| 2,737,518 | Herzog | Mar. 6, 1956 |
| 2,751,379 | Sondheimer | June 19, 1956 |
| 2,773,075 | Wilson et al. | Dec. 4, 1956 |
| 2,831,874 | Walker | Apr. 22, 1958 |
| 2,885,412 | Hirschmann et al. | May 5, 1959 |

OTHER REFERENCES

"Experientia," Kaufman et al., vol. 7 (1951), page 260.

Djerassi: Jour. Am. Chem. Soc., 69: 2404–2410 (1947).

Rosenkranz: Jour. Am. Chem. Soc., 72: 1046 (1950); 4077–4080 (1950); 75: 1277–1282 (1953).